United States Patent [19]

Murase et al.

[11] Patent Number: 5,445,871
[45] Date of Patent: Aug. 29, 1995

[54] SURFACE-MODIFIED PLASTIC PLATE

[75] Inventors: Heihachi Murase; Tsutomu Norimatsu; Masao Ogawa; Naoya Haruta, all of Hiratsuka, Japan

[73] Assignee: Kansai Paint Co., Ltd., Amagasaki, Japan

[21] Appl. No.: 279,066

[22] Filed: Jul. 22, 1994

Related U.S. Application Data

[63] Continuation of Ser. No. 874,703, Apr. 28, 1992, abandoned, which is a continuation-in-part of Ser. No. 798,115, Nov. 26, 1991, abandoned, and Ser. No. 783,905, Oct. 29, 1991, abandoned.

[30] Foreign Application Priority Data

Oct. 30, 1990 [JP] Japan ................. 2-292703
Nov. 29, 1990 [JP] Japan ................. 2-331394
Nov. 29, 1990 [JP] Japan ................. 2-331395

[51] Int. Cl.⁶ ........................... B32B 7/02
[52] U.S. Cl. ..................... 428/215; 428/213; 428/336; 428/411.1; 428/412; 428/429; 428/447; 428/448; 428/451; 428/688; 428/704
[58] Field of Search .............. 428/213, 216, 411.1, 428/412, 425.5, 425.6, 429, 447, 448, 451, 500, 688, 702, 704, 336, 215

[56] References Cited

U.S. PATENT DOCUMENTS

| | | | |
|---|---|---|---|
| 4,029,842 | 6/1977 | Yoshida et al. | 428/334 |
| 4,190,681 | 2/1980 | Hall et al. | 427/45.1 |
| 4,235,954 | 11/1980 | Humphrey, Jr. | 428/412 |
| 4,765,729 | 8/1988 | Taniguchi | 351/163 |
| 4,889,757 | 12/1989 | Horigome et al. | 428/64 |
| 4,927,704 | 5/1990 | Reed et al. | 428/221 |
| 4,929,494 | 5/1990 | Matsui | 428/286 |
| 5,047,270 | 9/1991 | Mori et al. | 428/35.2 |
| 5,051,308 | 9/1991 | Reed et al. | 428/412 |
| 5,061,558 | 10/1991 | Fischer et al. | 428/332 |
| 5,165,992 | 11/1992 | Yajima | 428/328 |
| 5,173,391 | 12/1992 | Hiraoko et al. | 430/200 |

FOREIGN PATENT DOCUMENTS 2-027317 1/1990 Japan .

*Primary Examiner*—Patrick J. Ryan
*Assistant Examiner*—Marie R. Macholl
*Attorney, Agent, or Firm*—Fisher, Christen & Sabol

[57] ABSTRACT

A surface-modified plastic plate for use in optical disc bases, windows of aircrafts, automobiles or of architectural structures, solar cell receptors, liquid crystal display panels and protective sheet of computer touch panels, which comprises a laminate consisting of a plastic substrate; a cured film of an actinic ray-curable primer composition, said cured film formed onto a surface of the plastic substrate in a film thickness of 0.1 to 10 μm; and an inorganic material layer formed onto the cured film by a physical deposition process and having a thickness of 0.1 μm or more but less than 1.0 μm; and a surface-modified plastic plate for use in windows, preferably windows of aircrafts, automobiles and architectural structures, which comprises a laminate consisting of a plastic plate, preferably comprising a plastic selected from polymethyl methacrylate polymer and polycarbonate in the case of the window of the aircraft; a cured film of a heat-curable primer composition, said cured film being formed on a surface of the plastic plate in a film thickness of 0.1 to 10 μm; and an inorganic material layer formed onto the cured film by a physical deposition process and having a thickness of 0.25 μm or more but less than 1.0 μm.

16 Claims, No Drawings

SURFACE-MODIFIED PLASTIC PLATE

This application is a Continuation of prior U.S. application Ser. No. 07/874,703 filed Apr. 28, 1992 now abandoned which is a continuation-in-part of application Ser. No. 07/798,115 filed Nov. 26, 1991 now abandoned and a continuation-in-part of application Ser. No. 07/783,905 filed Oct. 29, 1991 now abandoned.

BACKGROUND OF THE INVENTION

(1) Field Of The Invention

The present invention relates to a surface-modified plastic plate for use in optical disc bases to make the bases free of misreading due to pitting, windows of aircraft for windproofing, windows of automobiles or of architectural structures, solar cell receptors, liquid crystal display panels, protective sheets for computer touch panels, etc.; the surface modified plastic plate is lightweight and shows improvements in mar-proof properties, impact resistance, prevention of adhesion of dust due to electrification and in weather resistance.

(2) Description Of The Prior Art

The optical disc as the high density recording medium has been practically used not only as one to be exclusively used for regeneration, but also as ones to be used for postscript, rewriting, etc., that is, various kinds of optical discs have been practically used. At present, plastics such as polymethyl methacrylate polymer, polycarbonate and the like, are used as an optical disc base material. Since these plastics have high static electrification properties and unsatisfactory hardness, adhesion of dust onto the surface and development of marrings on the surface take place, often resulting in errors on reading. When the optical disc is used, the spill of an alcoholic drink thereonto also creates problems such as whitening. For the purpose of solving the above problems, a method of forming an acrylate based protective film layer onto an optical disc base, a method of incorporating an antistatic agent for destaticizing, etc., have been developed. These methods, however, raise problems so that it is impossible for them to obtain satisfactory mar resistance and antistatic properties, and in addition, the incorporation of the antistatic agent results in a further reduction in solvent resistance.

A plastic plate which comprises polymethyl methacrylate or the like, which is light in weight and has good transparency, has been used in the art as a window in aircraft for wind-proofing. However, use of the above plastic plate itself raises a problem whereby crazing develops on the surface in a service time of about 2 years, resulting in a loss of clarity.

Reasons for the development of crazing may include physical factors and chemical factors. The physical factor may include marring of the surface of the plastic plate due to the action of dust which develops microcracking followed by enlargement of the micro-cracking to develop macro-cracking, etc. The chemical factor may include etching of the surface of the plastic plate by acid rain, etc.

In order to prevent development of the above crazing, there has been proposed a process for preventing the development of crazing which comprises forming a film selected from an organic film which comprises, for example, polyester-urethane, polyurethane, methacrylate polymer or the like, and from an inorganic film which comprises, for example, tin oxide, indium oxide or the like onto a plastic substrate. However, the process which comprises the formation of the organic film raises such problems as the film being incapable of obtaining satisfactory hardness, chemical resistance and antistatic properties. On the other hand, the process which comprises the formation of the inorganic film raises such problems as the film being incapable of obtaining a satisfactory adhesion to the plastic substrate.

In recent years, studies have been made on how to make cars more lightweight for the purposes of reduction in fuel consumption and improvement of running performance. A sandwich panel formed by sandwiching a resin between glasses is generally known as the window for use in automobiles. Since the sandwich panel, however, is heavy, replacement of glass by plastic is being carried out as a means of decreasing automobile weight.

On the other hand, the windows used in architectural structures are generally made of glass and raise problems such as how easily they can be broken by impact. Particularly, windows unbreakable by impact are demanded and replacement of glass by plastic is being carried out in the case of large-sized windows, windows used in a terrace as a shelter against rain, windows used in high-rise buildings, etc. because of the frequency of glass cracking, the safety involved, cost of repairing, etc.

The transparent, lightweight plastic substrate is widely used as a substitute for window glass for use in building materials, automobiles and architectural structures because of its high mechanical strength and impact resistance as well as ease of fabrication. On the other hand, use of the above plastic substrate raises problems such as the surface of the plastic plate being more easily marred and more easily whitened by marring, such as dust more easily adhering onto the surface of the plastic plate due to electrification, and further that yellowing may more easily take place when the plastic plate is used outdoors as compared with glass.

Recently, the solar cell has widely been used as a part of energy saving. A protective plate used in the receptor of the solar cell and corresponding to a window therein is formed by use of a plastic plate, and raises problems such as its energy conversion efficiency being reduced because of yellowing due to exposure to sun light, development of marrings and adhesion of dust.

A protective plate used in a liquid crystal display panel of a liquid crystal display and corresponding to a window therein is being replaced by a lightweight plastic plate in place of a glass plate, which results in problems such as the development of marrings on the surface, adhesion of dust onto the surface due to electrification, and the like.

A plastic plate such as a polycarbonate plate or the like has been used as a protective sheet of a touch panel of a computer, etc., which results in problems such as the development of marrings caused by touching the surface with one's fingers, pollution caused by adhesion of dust on the surface of a display section, and the like.

Thus, improvements of the above-mentioned plastic plates for use in the windows of aircraft, automobiles, architectural structures, solar cell receptors, liquid crystal display panels, protective sheets of computer touch panels, etc. are demanded; for example, improved hardness properties, anti-marring properties, antistatic properties, chemical resistance and improved weather resistance.

For the purpose of solving the above problems, there is proposed a process which comprises forming a film by means of a physical deposition of silica, etc. on the surface of a plastic plate to cover the surface of the plastic plate with a ceramic film. However, the process results in raising such problems as unsatisfactory adhesion properties between the plastic plate and the ceramic film which makes the adhesion easily separated under high temperatures and high humidity.

SUMMARY OF THE INVENTION

It is an object of the present invention to provide a surface-modified plastic plate, which comprises a laminate prepared by forming a cured primer film onto a plastic substrate, followed by depositing an inorganic material layer onto the cured primer film, and which is such that the cured primer film has a satisfactory hardness and shows good adhesion properties to both the plastic substrate and the inorganic material layer, and that the inorganic material layer show good chemical resistance such as acid resistance, alkali resistance, solvent resistance and the like so as to be resistant to acid rain; to have antistatic properties to prevent dust in the air from adhering to it; and further show good marring resistance and weather resistance.

It is another object of the present invention to provide a surface-modified plastic plate suitable for use in optical disc bases to make the bases free of misreading due to pitting, for use in windows of aircraft, for windproofing, in automobiles or architectural structures, solar cell receptors, liquid crystal display panels, protective sheets of computer touch panels, etc.

First, the present invention provides a surface-modified plastic plate, which comprises a laminate consisting of a plastic substrate; a cured film of an actinic ray-curable primer composition which contains a binder component consisting of 30 to 100 parts by weight of (a) an essential component selected from a group which consists of at least one compound, at least one resin and mixtures thereof, has at least two polymerizable unsaturated double bond-containing groups, the same or different, in the molecule and has an average number molecular weight of 200 to 20000; and, as an optional component, 0 to 70 parts by weight of (b) a polymerizable unsaturated monomer copolymerizable with the component (a), a total amount of the component 0 and the component (b) being 100 parts by weight; the cured film is formed onto a surface of the plastic substrate in a film thickness of 0.1 to 10 μm; and an inorganic material layer is formed onto the cured film by a physical deposition process and has a thickness of 0.1 μm or more but less than 1.0 μm.

Secondly, the present invention provides a surface-modified plastic plate for use in windows, preferably windows of aircraft, automobiles and architectural structures, which comprises a laminate which consists of a plastic plate; a cured film of a heat-curable primer composition containing, as a major component, at least one selected from a group represented by the general formula [I]:

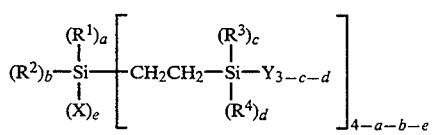

where $R^1$, $R^2$, $R^3$ and $R^4$ are the same or different and represent a substituted or unsubstituted alkyl group, aryl group or alkenyl group, each of these groups having 1 to 13 carbon atoms; X and Y are the same or different and represent a hydrolyzable group; a, b, c, and d are an integer of 0 or 1; e is an integer of 0 to 4; and a total of a, b and e is an integer of 2 to 4, a hydrolyzate of the compound and a condensate of the compound; the cured film is formed on a surface of the plastic plate in a film thickness of 0.1 to 10 μm; and an inorganic material layer is formed onto the cured film by a physical deposition process and has a thickness of 0.25 μm or more but less than 1.0 μm.

DETAILED DESCRIPTION OF THE INVENTION

The plastic substrate in the present invention may include any plastic plates or plastic films which have good strength, transparency and fabricating properties, and examples of the plastic substrate material which constitute the plastic substrate may include polyolefin such as polyethylene, polyester such as polyethylene terephthalate, polycarbonate, polymethyl methacrylate polymer, polyamide, polystyrene, polyurethane, polyether imide, polysulfone, epoxy resin, and the like. The polymethyl methacrylate polymer includes homopolymer and copolymer which contains methyl methacrylate as a monomer component in an amount of 90 percent by weight or more.

The above plastic substrate may include ones obtained by subjecting the above plastic plate to a surface treatment and ones obtained by laminating a plastic film onto the above plastic plate. The surface-treated plastic plate may include, for example, ones obtained by subjecting the plastic plate to a surface treatment by forming thereon a coating film of a polymethyl methacrylate based coating composition or polyurethane based coating composition. The plastic film-laminated plastic plate may include ones obtained by laminating a polycarbonate film, polyethylene terephthalate film or the like onto the plastic plate.

The surface-modified plastic plate in the present invention may include ones used in optical disc bases, windows of aircraft, automobiles or architectural structures, solar cell receptors, liquid crystal display panels and as protective sheets of computer touch panels.

It is necessary for the plastic used as the surface-modified plastic plate for use in the window of an aircraft to have a satisfactory strength and transparency to be used as the window of an aircraft, and the above plastic includes polymethyl methacrylate polymer and polycarbonate. The above polymethyl methacrylate polymer includes a homopolymer of methyl methacrylate and copolymers of such monomer components so as to contain methyl methacrylate as a major monomer component in an amount of 90 percent by weight or more based on the total monomer components of the above plastic plates, and a plastic plate of polymethyl methacrylate in accordance with MIL Standard, MIL-P-25690A is particularly preferred.

The plastic plate used as a substrate of the surface-modified plastic plate for use in the windows of automobiles and architectural structures may include any plastic plates which have good strength, transparency and fabricating properties, and examples of the above plastic plates may include those which comprise polycarbonate, polymethyl methacrylate polymer, polyethylene, polyamide, polyester such as polyethylene terephthalate, polyurethane, polyether imide, epoxy resin and the like. The above plastic plate may include surface-treated plastic plates obtained by subjecting the above plastic plates to a surface treatment, for example, forming a film of a polymethyl methacrylate coating composition or polyurethane coating composition onto the surface of the above plastic plate.

When the surface-modified plastic plate is used in the optical disc base, a plastic plate or polymethyl methacrylate polymer, polycarbonate or polyolefin is particularly preferred as the plastic substrate.

The optical disc base in the present invention may include those used in the optical discs such as the video disc, audio disc, a disc for use in document filing, a disc for use in a computer memory and the like, including a photomagnetic disc.

According to the present invention, a cured film of an actinic ray-curable primer composition which contains a binder component which consists of (a) an essential component selected from a group which consists of at least one resin and mixtures thereof (hereinafter simply referred to as a film-forming component (a)), has at least two polymerizable unsaturated double bond-containing groups, the same or different, in the molecule; and as an optional component, (b) a polymerizable unsaturated monomer (hereinafter simply referred to as a monomer (b)) copolymerizable with the film-forming component (a), is formed onto a surface of the plastic substrate. It is necessary for the cured film to have satisfactory transparency and good adhesion properties within both the plastic substrate material and the inorganic material layer deposited thereonto.

The film-forming component (a) is required to have at least two polymerizable unsaturated double bond-containing groups per one molecule. An amount thereof is preferably in the range of 0.1 to 10 moles, more preferably 0.2 to 5 moles per one kg of the film-forming component (a) from the standpoint of curing properties. When less than 0.1 mole, curing of the resin becomes unsatisfactory, and, on the other hand, when more than 10 moles, mechanical properties of the cured film may be reduced.

The film-forming component (a) is required to have an average number molecular weight of 200 to 20000. When the molecular weight is less than 200, a marked shrinkage upon curing results in the development of crazing in the cured film itself and crazing in the inorganic material layer formed by deposition. On the other hand, when the molecular weight is more than 20000, an increased viscosity raises problems for the coating operations.

Examples of the resins usable as the film-forming component (a) may include resins prepared by condensation of polyester with polymerizable unsaturated double bond-containing acid such as (meth)acrylic acid, polymerizable unsaturated double bond-containing polyurethane resin, polymerizable unsaturated double bond-containing phosphorus epoxy resin, polymerizable unsaturated double bond-containing vinyl copolymer resin, polymerizable unsaturated double bond-containing silicone resin, polymerizable unsaturated double bond-containing melamine resin, and the like. Of these, polymerizable unsaturated double bond-containing vinyl copolymer resin and polymerizable unsaturated double bond-containing silicone resin are particularly preferred.

Examples of the polymerizable unsaturated double bond-containing group may preferably include an acryloyl group and methacryloyl group.

Introduction of the polymerizable unsaturated double bond-containing group into the resin in the film-forming component (a) may be carried out according to the conventional process. The polymerizable unsaturated double bond-containing resin may be obtained by the application of respective reactions between functional groups such as (i) addition reaction between a carboxyl group and epoxy group, (ii) addition reaction between a hydroxyl group and epoxy group, (iii) esterification reaction between hydroxyl group and carboxyl group, (iv) addition reaction between an isocyanate group and hydroxyl group, (v) dealcoholation reaction between an alkoxysilane group and hydroxyl group, (vi) cocondensation reaction between alkoxysilyl groups, and the like, to a reaction of a compound which has one functional group (hereinafter referred to as a first functional group) and polymerizable unsaturated double bond-containing group with a resin or a compound which has another functional group (hereinafter simply referred to as a second functional group). Of these, the application of the above (i), (iv), (v) or (vi) reaction is particularly preferred.

Examples of the compound which has the first functional group and polymerizable unsaturated double bond-containing group may include carboxyl group-containing compounds such as acrylic acid, methacrylic acid, crotonic acid, itaconic acid, maleic acid, fumaric acid and the like; epoxy group-containing compounds such as glycidyl acrylate, glycidyl methacrylate, 3,4-epoxy cyclohexyl methyl acrylate, 3,4-epoxy cyclohexyl methyl methacrylate, 3,4-epoxy cyclohexyl vinyl ether, allyl glycidyl ether, and the like; hydroxyl group-containing compounds such as 2-hydroxyethyl acrylate, 2-hydroxyethyl methacrylate, hydroxypropyl acrylate, hydroxypropyl methacrylate, hydroxylbutyl methacrylate, N-methylolacrylamide, N-methylolmethacrylamide, hydroxyethyl vinyl ether, allyl alcohol, an adduct of 2-hydroxyethyl acrylate or 2-hydroxyethyl methacrylate with $\epsilon$-caprolactone, and the like; isocyanate group-containing compounds such as isocyanato ethyl acrylate, isocyanato ethyl methacrylate, m-isopropenyl-$\alpha,\alpha$-dimethylbenzyl isocyanate, and the like; alkoxysilane such as vinyltrimethoxysilane, $\gamma$-(methyl)acryloyloxypropyl trimethoxysilane and the like; and the like.

Examples of the resin, which has the second functional group and is reacted with the compound which has the first functional group and polymerizable unsaturated double bond-containing group, may include, in the case where the film-forming component (a) is, for example, a polymerizable unsaturated double bond-containing vinyl copolymer resin, a copolymer between a polymerizable unsaturated monomer which has the second functional group and a polymerizable unsaturated monomer copolymerizable with the former polymerizable unsaturated monomer; and the like.

The polymerizable unsaturated monomer which has the second functional group may include those exemplified as the compound which has the first functional group and polymerizable unsaturated double bond-containing group.

The polymerizable unsaturated monomer copolymerizable with the polymerizable unsaturated monomer which has the second functional group may include, in addition to the polymerizable unsaturated monomer which has the second functional group, other polymerizable unsaturated monomers described hereinbelow.

Examples of the above other polymerizable unsaturated monomers may include $C_{1-18}$ alkyl ester or cycloalkyl ester of acrylic acid or methacrylic acid such as methyl acrylate, ethyl acrylate, n-propyl acrylate, isopropyl acrylate, n-, i-, t-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-, i-, t-butyl methacrylate, hexyl methacrylate, cyclohexyl methacrylate, 2-ethylhexyl methacrylate, tridecyl methacrylate, lauryl methacrylate, stearyl methacrylate, and the like; $C_{2-18}$ alkoxyalkyl ester of acrylic acid or methacrylate acid such as methoxybutyl acrylate, methoxybutyl methacrylate, methoxyethyl acrylate, methoxyethyl methacrylate, ethoxybutyl acrylate, ethoxybutyl methacrylate, and the like; polymerizable amide such as acrylamide, methacrylamide, N-methyl acrylate, N-ethyl methacrylamide, N-methoxymethyl acrylamide, N-butoxymethyl acrylamide, N,N-dimethylacrylamide, N,N-dimethylaminopropyl acrylamide and the like; nitrogen-containing alkyl (meth)acrylate) such as N,N-dimethylaminoethyl (meth)acrylate, N,N-diethylaminoethyl(meth)acrylate, N-t-butylaminoethyl (meth)acrylate and the like; polymerizable nitrile such as acrylonitrile, methacrylonitrile and the like; vinyl ethers such as ethyl vinyl ether, n-propyl vinyl ether, isopropyl vinyl ether, n-butyl vinyl ether, t-butyl vinyl ether, pentyl vinyl ether, hexyl vinyl ether, cyclohexyl vinyl ether, phenyl vinyl ether and the like; vinyl esters such as vinyl acetate, vinyl propionate, VEOVA monomer (Trade name, marketed by Shell Chemical Co., Ltd.) and the like; vinyl aromatic compounds such as styrene, α-methylstyrene, vinyltoluene, α-chlorostyrene and the like; olefin compounds such as ethylene, propylene, butylene and the like; diene compounds such as butadiene, isoprene, chloroprene and the like; and the like.

In the case where the film-forming component (a) is a polymerizable unsaturated double bond-containing silicone resin, it may be obtained by a condensation reaction of a silane compound which has a polymerizable unsaturated double bond-containing group and a hydrolyzable group as the compound which has the first functional group and polymerizable unsaturated double bond-containing group with a silane compound which has a hydrolyzable group as the compound which has the second functional group.

The first functional group and the second functional group as the hydrolyzable group may be the same or different, and the hydrolyzable group may include hydrolyzable groups bonding directly to a silicon atom, for example, alkoxy groups such as a methoxy group, ethoxy group, propoxy group, butoxy group, β-methoxyethoxy group and the like; a halogen atom such as chlorine; an acyloxy group such as an acetoxy group, propionyloxy group and the like; and the like. Of these, an alkoxy group having 1 to 3 carbon atoms is preferred.

Typical examples of the silane compound which has a polymerizable unsaturated double bond-containing group and the hydrolyzable group as the first functional group may include γ-(meth)acryloyloxypropyltrimethoxysilane, vinyltrimethoxysilane, vinyltriethoxysilane and the like.

Typical examples of the silane compound which has the hydrolyzable group as the second functional group may include tetraalkoxysilane such as orthomethyl silicate, orthoethyl silicate, orthoisopropylsilicate, ortho-n-butyl silicate and the like; trialkoxysilane such as methyltrimethoxysilane, methyltriethoxysilane, methyltripropoxysilane, methyltributoxysilane, ethyltrimethoxysilane, ethyltriethoxysilane, hexyltriethoxysilane, octyltriethoxysilane, γ-chloropropyltriethoxysilane, glycidoxymethyltriethoxysilane, γ-mercaptopropyltriethoxysilane, γ-methacryloyloxypropyltriethoxysilane, cyclohexyltriethoxysilane, cyclohexylmethyltriethoxysilane, β(3,4-epoxycyclohexyl)ethyltriethoxysilane, phenethyltriethoxysilane, phenyltriethoxysilane, toluyltriethoxysilane, vinyltriethoxysilane, allyltriethoxysilane and the like; dialkoxysilane such as dimethyldiethoxysilanedimethyldiethoxysilane, phenylmethyldiethoxysilane, γ-aminopropylmethyldiethoxysilane, glycidoxymethylmethyldiethoxysilane, benzylmethyldiethoxysilane and the like; acyloxysilane such as methyltriacetoxysilane and the like; halogenated silane such as methyltrichlorosilane, alkoxysilane which has two silyl groups bonded with an ethylene group, for example, β-(dimethylmethoxysilyl)-ethylmethyldiethoxysilane, di-[β-(dimethylethoxysilyl)ethyl]dimethylsilane, β-(trimethoxysilyl)-ethyltrimethoxysilane and the like; and the like.

The cocondensation reaction of the silane compound which has a polymerizable unsaturated double bond-containing group and a hydrolyzable group with the silane compound which has the hydrolyzable group may easily be carried out by a known process, for example, by subjecting it to hydrolysis and condensation in the presence of water and a catalyst, for example a mineral acid such as hydrochloric acid, organotin, or the like. The degree of the hydrolysis and condensation may suitably be varied according to an amount of water, the kind and amount of the catalyst, a reaction temperature, a reaction time, etc.

Examples of the compound usable as the film-forming compound (a) in the present invention may include poly(meth)acrylate of polyether polyol, for example, di(meth)acrylate of polyoxoethylene glycol, di(meth)acrylate of polyoxypropylene glycol, etc.; poly(meth)acrylate of a polyol compound such as tri(meth)acrylate of a polymethylol compound represented by the general formula:

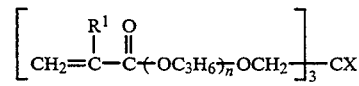

where n is an integer of 0 to 10, $R^1$ is $CH_3$ or hydrogen atom, X is an alkyl group or hydroxyalkyl group which has 1–5 carbon atoms respectively; pentaerythritol tetra(meth)acrylate, 1,6-hexanediol di(meth)acrylate, dipentaerythritol penta(meth)acrylate, dipentaerythritol hexa(meth)acrylate and the like; a compound represented by the general formula:

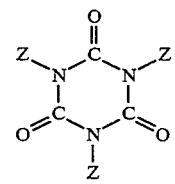

where Z is

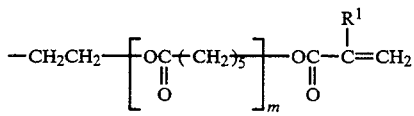

$R^1$ is as defined above, and m is 0 or 1; and adduct of polyol with a monoisocyanate compound which has a (meth)acryloyl group such as an adduct of one mole of trimethylol propane with 3 moles of isocyanato ethyl(meth)acrylate, an adduct of one mole of pentaerythritol with 4 moles of isocyanato ethyl(meth)acrylate, and the like; a phosphagen compound represented by the general formula:

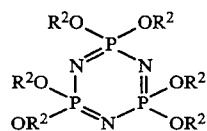

where $R^2$ is

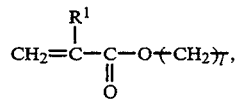

where $R^2$ is as defined above and l is an integer of 1 to 4; and the like. Of these, the phosphagen compound, wherein $R^2$ is

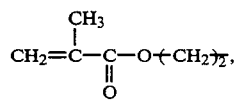

is preferred in that the strain due to shrinkage on curing is small, and it is possible to form a film which has a high degree of hardness.

The compound which has at least two of the polymerizable unsaturated double bond-containing groups in the molecule and the resin which has at least two of the polymerizable unsaturated double bond-containing groups in the molecule may be used alone or in combination as the film-forming component (a).

The actinic ray-curable primer composition in the present invention may include, in addition to the film-forming component (a) as the essential component, the monomer (b) as the optional component. The monomer (b) is a polymerizable unsaturated monomer copolymerizable with the film-forming component (a) and may optionally be used for the purpose of modification, etc. of the physical properties such as hardness, degree of crosslinking and the like, depending on the intended cured primer film. Examples of the monomer (b) may include: a monomer usable as the polymerizable unsaturated monomer copolymerizable with the polymerizable unsaturated monomer which has the second functional group in the production for the polymerizable unsaturated double bond-containing vinyl copolymer resin; a polyvinyl monomer other than the film-forming component (a) and which has two or more of the polymerizable unsaturated groups, for example, ethylene glycol di(meth)acrylate, propylene glycol diacrylate, divinyl benzene, etc.; and the like.

The amount of the film-forming component (a) and that of the monomer (b) are such that the film-forming component (a) is in the range of from 30 to 100 parts by weight, preferably 60 to 100 parts by weight, and the monomer (b) is in the range of from 0 to 70 parts by weight, preferably 0 to 40 parts by weight, provided the total amount is 100 parts by weight. When the amount of the film-forming component (a) is less than 30 parts by weight, problems are raised such as: the physical properties of the cured primer film are reduced and crazing is developed in the cured primer film, and crazing may develop in the inorganic material layer on depositing the inorganic material layer.

The actinic ray-curable primer composition may include, in addition to the film-forming component (a) and the monomer (b), an organic solvent capable of dissolving the binder component, a leveling agent, etc. Examples of the above organic solvent may include an alcohol solvent such as ethanol, isopropanol, n-butanol, isobutanol, ethylene glycol monoethyl ether and the like; a ketone solvent such as acetone, methyl ethyl ketone, methyl isobutyl ketone and the like; an ester solvent such as ethyl acetate, butyl acetate, ethylene glycol monoethyl ether acetate, and the like; an aliphatic hydrocarbon solvent such as hexane, heptane and the like; an aromatic hydrocarbon solvent such as toluene, xylene and the like; and the like. The leveling agent may include those for use in a coating composition, i.e., acryl based, silicone based, and fluorine based ones.

The actinic ray-curable primer composition in the present invention may be cured by the irradiation of actinic rays such as electron rays, ultraviolet light, visible light and the like to form a cured film on the surface of the plastic substrate. In the case where curing is carried out by irradiation of ultraviolet light of visible light, it is necessary for a photopolymerization initiator to be incorporated beforehand into the composition. The photopolymerization initiator may include the conventional photopolymerization initiator which is activated by irradiation of ultraviolet light or visible light to generate a radical. Examples of the photopolymerization initiator may include benzoin, benzoin methyl ether, benzoin ethyl ether, benzoin n-propyl ether, benzoin isopropyl ether, benzoin n-butyl ether, α-hydroxyisobutylphenone, benzophenone, p-methylbenzophenone, Michler's ketone, acetophenone, 1-hydroxy-1-cyclohexylacetophenone, 2-methyl-1-[4-(methylthio)-phenyl]-2-morpholinopropane, 2-chlorothioxanthone, anthraquinone, 2-methylanthraquinone, phenyldisulfide, 2-nitrofluorene, organotitanocene compound, metallocene compound, and the like. These photopolymerization initiators may be used alone or in combination, and preferably in the range of 0.1 to 15 parts by weight per 100 parts by weight of the total of the film-forming component (a) and the monomer (b) in the actinic ray-curable primer composition.

In order to promote the photopolymerization reaction with the photopolymerization initiator, a photosensitizer may be used in combination with the photopolymerization initiator. Examples of the photosensitizer usable in combination may include tertiary amine such as triethyl amine, triethanol amine, 2-dimethyl aminoethanol, and the like; alkyl phosphine such as triphenylphosphine and the like; thioether such as β-thiodiglycol; ketocuomarin; merocyanine dyestuff; and the like. These photosensitizers may be used alone or in combination, and preferably in the range of 0.1 to 15 parts by weight per 100 parts by weight of the total of the film-forming component (a) and the monomer (b).

On the other hand, in the case where the actinic ray-curable primer composition is cured by irradiation of electron rays, there is no need to use the photopolymerization initiator and the photosensitizer.

According to the present invention, a cured film of the actinic ray-curable primer composition may be formed by a process which comprises coating a viscosity-controlled actinic ray-curable primer composition onto the surface of a plastic substrate as the substrate to a cured film thickness of 0.1 to 10 μm, preferably 0.5 to 5 μm according to a dip coating process, spray coating process, spin coating process, bar coater coating process, etc., evaporating an organic solvent, when present, followed by irradiating actinic rays such as ultraviolet light, visible light, electron rays and the like for curing.

The above viscosity on coating may suitably be determined depending on the coating process and intended film thickness, but preferably is in the range of 2 to 500 centipose by use of the Brookfield type viscometer (60 rpm).

The electron rays generator used as the electron rays source in the case where the primer composition is cured by irradiation of electron rays, may include the Cockcroft type, Cockcroft-Walton type, van de Graaf type, resonance transformer type, transformer type, insulating core transformer type, dynamitron, linear filament type, and high-frequency type ones, and the like. The irradiation condition of the electron rays may vary depending on the thickness of the cured film of the actinic ray-curable primer composition in the present invention, etc., but generally an irradiation dose in the range of 1 to 20 Mrad is suitable.

The ultraviolet light irradiation source may not be specially limited, but an irradiation source, which generates lights which contain ultraviolet light in the range of 150 to 450 nm, may usually be used. Examples of the ultraviolet light or visible light source may include a mercury lamp, xenon lamp, carbon arc lamp, metal halide lamp, solar light, argon ion laser and the like. The irradiation of these actinic rays is preferably carried out in air or in an inactive gas atmosphere.

Thus, a cured film of the actinic ray-curable primer composition, which has a satisfactory transparency and good adhesion properties to both the plastic substrate and the inorganic material layer deposited thereonto, is formed on the surface of the plastic substrate.

The surface-modified plastic plate of the present invention is such that an inorganic material layer formed by the physical deposition process in a thickness of 0.1 μm or more but less than 1.0 μm, preferably 0.25 μm or more but less than 1.0 μm, more preferably 0.5 to 0.8 μm, is deposited on a cured film of the actinic ray-curable primer composition, which is formed on the surface of the plastic substrate.

According to the present invention, a cured film of a heat-curable primer composition which contains, as a major component, at least one member selected from a compound represented by the general formula [I]:

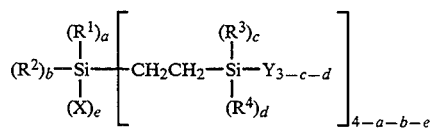

where $R^1$, $R^2$, $R^3$ and $R^4$ are the same or different and represent a substituted or unsubstituted alkyl group, aryl group or alkenyl group, each of these groups has 1 to 13 carbon atoms; X and Y are the same or different and represent a hydrolyzable group, a, b, c, and d are an integer of 0 or 1; e is an integer of 0 to 4; and a total of a, b and e is an integer of 2 to 4, a hydrolyzate of the compound and a condensate of the compound, is formed on a surface of the plastic plate as a substrate. It is necessary for the above cured film to have a satisfactory transparency and good adhesion properties to both the substrate and the inorganic material layer laminated thereonto.

Examples of the groups of $R^1$, $R^2$, $R^3$ and $R^4$ in the general formula [I] may include substituted or unsubstituted alkyl groups such as a methyl group, ethyl group, propyl group, butyl group, hexyl group, octyl group, methoxyethyl group, γ-chloropropyl group, glycidoxymethyl group, γ-methacryloyloxypropyl group, γ-aminopropyl group, γ-mercaptopropyl group, β-(3,4-epoxycyclohexyl)ethyl group, cyclohexyl group, cyclohexylmethyl group, benzyl group, phenethyl group and the like; an aryl group such as a phenyl group, toluyl group and the like; and an alkenyl group such as a vinyl group, allyl group and the like. Of these groups, an alkyl group is preferred, and an alkyl group having 1 to 4 carbon atoms is particularly preferred from the standpoint of the hardness of the resulting cured primer film.

X and Y in the general formula [I] are the same or different and are a hydrolyzable group. Examples of the above X and Y may include alkoxy groups such as a methoxy group, ethoxy group, propoxy group, butoxy group, β-methoxyethoxy group and the like; a halogen atom such as chlorine; an acyloxy group such as an acetoxy group, propyonyloxy group and the like; and the like. Of these, an alkoxy group having 1 to 3 carbon atoms is preferred, and an ethoxy group is more preferred from the standpoints of reactivity and storage stability.

The typical examples of the compound represented by the general formula [I] may include tetraalkoxysilane such as orthomethyl silicate, orthoethyl silicate, orthoisopropyl silicate, ortho-n-butyl silicate and the like; trialkoxysilane such as methyltrimethoxysilane, methyltriethoxysilane, methyltripropoxysilane, methyltributoxysilane, ethyltrimethoxysilane, ethyltriethoxysilane, hexyltriethoxysilane, octyltriethoxysilane, γ-chloropropyltriethoxysilane, glycidoxymethyltriethoxysilane, γ-mercaptopropyltriethoxysilane, γ-methacryloyloxypropyltrimethoxysilane, cyclohexyltriethoxysilane, cyclohexylmethyltriethoxysilane, β-(3,4-epoxycyclohexyl) ethyltriethoxysilane, phenethyltriethoxysilane, phenyltriethoxysilane, toluyltriethoxysilane, vinyltriethoxysilane, allyltriethoxysilane and the like; dialkoxysilane such as dimethyldimethoxysilane, dimethyldiethoxysilane, phenmethyldiethoxysilane, γ-aminopropylmethyldiethoxysilane, glycidoxymethylmethyldiethoxysilane, benzylmethyldiethoxysilane and the like; acyloxysilane such as methyltriacetoxysilane and the like; halogenated silane such as methyltrichlorosilane, alkoxysilane which has two silyl groups bonded with an ethylene group, for example β-(dimethylmethoxysilyl)ethylmethyldiethoxysilane, di-[β-(dimethylethoxysilyl)ethyl]dimethylsilane, β-(trimethoxysilyl)ethyltrimethoxysilane and the like; and the like.

The heat-curable primer composition of the present invention may be one which contains, as a major component, a hydrolyzate or condensate of the compound represented by the general formula [I]. The above hydrolyzate may easily be prepared by a known process, for example, by hydrolyzing the compound represented by the general formula [I] in the presence of water and a catalyst, for example, a mineral acid such as hydrochloric acid, organotin, or the like. The above condensate may easily be prepared, for example, by condensation of the above hydrolyzate. The degree of the hydrolysis and condensation may suitably be varied according to the amount of water, the kind and amount of the catalyst, reaction temperature, reaction time, etc.

It is desirable for the compound represented by the general formula [I], or the hydrolyzate or condensate of the compound represented by the general formula [I] (hereinafter may be referred to as a film-forming silicone component) as the major component of the heat-curable primer composition used in the present invention, to have a number average molecular weight of 200 to 2000, particularly 250 to 700 from the standpoint of wettability to the substrate, coating properties, etc. In addition, it is preferred from the standpoints of the hardness and flexibility of the resulting cured primer film that the above film-forming silicone component has, on an average, an inorganic moiety; organic moiety weight ratio, i.e.

Si: [$R^1+R^2+R^3+R^4$+(ethylene groups between Si and Si)] in the range of 20:80 to 80:20, preferably 40:60 to 70:30.

The heat-curable primer composition in the present invention may also contain, in addition to the above major component, a solvent, curing catalyst, leveling agent, ultraviolet light absorber, etc. for the purpose of improvements in coating properties, etc. Examples of the above solvent may include an alcohol solvent such as ethanol, isopropanol, n-butanol, isobutanol, ethylene glycol monoethyl ether and the like; a ketone solvent such as acetone, methyl ethyl ketone, methylisobutyl ketone and the like; an ester solvent such as ethyl acetate, butyl acetate, ethylene glycol monoethyl ether acetate and the like; and aliphatic hydrocarbon solvent such as hexane, heptane and the like; an aromatic hydrocarbon solvent such as toluene, xylene and the like; water and the like. The amount of the solvent contained in the primer composition may suitably be varied depending on the viscosity of the heat-curable primer composition, coated film thickness, etc. and may not specifically be limited, but may normally be 40 to 99 percent by weight, preferably 60 to 95 percent by weight of the heat-curable primer composition. Examples of the curing catalyst to be used may include a carboxylate such as acetate, octylate and the like, a metal such as sodium, potassium, zinc, tin, titanium and the like; chlorides of the above metals; quaternary ammonium salt such as tetrabutyl ammonium bromide, and the like. Examples of the above leveling agent may include a silicone based leveling agent and a fluorine based leveling agent used in the coating composition. Examples of the above ultraviolet light absorber may include a benzophenone based one, benzotriazole based one, salicylate based one, hindered amine based one, etc. The above curing catalyst, leveling agent and ultraviolet light absorber may be used in an amount of 10 parts by weight or less, effectively 0.1 to 5 parts by weight per 100 parts by weight of the film-forming silicone component in the heat-curable primer composition respectively. In addition, the heat-curable primer composition may contain, if needed, a colloidal silica dispersion dispersed in an organic solvent such as alcohol and Cellosolve for the purpose of improvements in film hardness.

Formation of the cured film of the heat-curable primer composition onto the substrate in the present invention may be carried out by coating the viscosity-controlled heat-curable primer composition onto the surface of the plastic plate as the substrate to a cured film thickness of 0.1 to 10 μm, preferably 0.5 to 5 μm, according to a dip coating process, spray coating process, spin coating process, bar coater coating process, etc. to be cured. The above curing may be carried out by letting the coated plastic plate stand at room temperature, but is usually carried out by heating at 40° to 130° C. for 1 minute to about 3 hours. The viscosity of the heat-curable primer composition on coating may suitably be determined depending on the coating process and the intended film thickness, but preferably is in the range of 2 to 50 centipoise in accordance with the Brookfield type viscometer (60 rpm). The above curing causes the hydrolyzable group and silanol group in the major component of the heat-curable primer composition to react to form a siloxane linkage for polymerizing, which results in forming a cured film, which is preferably of three dimensional structure. The flexibility and hardness of the cured film are greatly affected depending on the weight ratio of the inorganic moiety, i.e., Si to the organic moiety, i.e., [$R^1+R^2+R^3+R^4$+(ethylene groups between Si and Si)] in the cured film. As the proportion of the inorganic moiety, i.e. Si is increased, hardness is increased and flexibility is reduced. On the contrary, as the proportion of the inorganic moiety, i.e., Si is decreased, flexibility is increased and hardness is reduced. The above proportion is determined depending on the kind of film-forming silicone component used as the major component of the heat-curable primer composition, and is determined according to a weight ratio of the inorganic moiety to the organic moiety in the film-forming component of the heat-curable primer composition.

Thus, a cured film which comprises the heat-curable primer composition and has satisfactory transparency and good adhesion properties to both the substrate and the inorganic material layer deposited thereonto is formed on the plastic plate.

The surface-modified plastic plate of the present invention is such that an inorganic material layer which has a thickness of 0.25 μm or more but less than 1.0 μm, preferably 0.5 to 0.8 μm, and is formed by a physical deposition process on the cured primer film which comprises the heat-curable primer composition, is formed on the surface of the plastic plate. When the film thickness is less than 0.25 μm, a satisfactory hardness is not obtained, which results in unsatisfactory chemical resistance. On the other hand, when the film thickness is 1.0 μm or more, crazing and separation may easily take place in the inorganic material layer because of a residual stress due to the formation of the inorganic material layer.

It is necessary for the inorganic material layer deposited on the cured primer film in the present invention to have a satisfactory hardness, chemical resistance, wear resistance and antistatic properties, and to show good water resistance and weather resistance. Examples of the inorganic material used for forming the inorganic material layer may include oxides such as SiO, $SiO_2$, $ZrO_2$, $Al_2O$, $TiO_2$, $Ti_2O_3$, $Y_2O_3$, $Yb_2O_3$, $MgO$, $Ta_2O_5$, $CeO_2$, $Hf$, $O_2$, and the like; nitrides such as $Si_3N_4$, $TiN$ and the like; fluorides such as $MgF_2$, $AlF_3$, $BaF_2$, $Na_3AlF_6$, $CaF_2$, $Na_5Al_3F_{14}$, and the like; silicides such as $TaSi_2$ and the like; carbides such as $ZrC$, $TiC$ and the like; sulfides as an $ZnS$; and the like. Of these, oxides are preferred, and $SiO_2$ and $Al_2O_3$ are particularly preferred.

The above inorganic material layer may be formed by the physical deposition process such as the vacuum deposition process, spattering and the like. The forming speed of the inorganic material layer is in the range of 0.05 to 2.0 nm/sec., preferably 0.1 to 0.6 nm/sec. When the forming speed becomes more than 2.0 nm/sec., strain may remain in the inorganic material layer in a large amount, which results in the likely development of crazing and separation. When the forming speed is less than 0.05 nm/sec., formation of the inorganic material layer takes too much time. The inorganic material layer is required to have a film thickness of 0.1 μm or more but less than 1.0 μm. When the film thickness is less than 0.1 μm, a satisfactory hardness is not obtained, which results in unsatisfactory chemical resistance. On the other hand, when the film thickness is 1.0 μm or more, crazing and separation may easily take place in the inorganic material layer because of a residual stress due to the formation of the inorganic material layer.

The surface-modified plastic plate in the present invention may be such a surface-modified one that a plastic film is laminated onto a plastic plate and the cured film is formed onto the surface of the laminated plastic plate, followed by forming the inorganic material layer thereonto, and may also be such a surface-modified one that a plastic film is subjected to the surface modification to form a surface-modified plastic film, followed by laminating the surface-modified plastic film onto a plastic plate.

The surface-modified plastic plate prepared by depositing the inorganic material layer through a specified cured primer film on the surface of the plastic substrate according to the present invention, has a surface which comprises the inorganic material layer and is hardly subjected to static electrification, which results in preventing dust from adhering thereonto, shows good mar resistance, chemical resistance such as acid resistance, alkali resistance, solvent resistance and the like to be resistant to acid rain, water resistance and weather resistance, and has a high degree of hardness. Moreover, since the cured primer film results in stress relaxation of an internal stress produced on forming the uppermost inorganic material layer, and the cured primer film itself shows good adhesion properties to both the plastic substrate and the inorganic material layer and has a satisfactory hardness, the surface-modified plastic plate of the present invention is such a surface-modified plastic plate as to have a high degree of hardness, and to comprise a laminate which shows good adhesion properties. Accordingly, the surface-modified plastic plate of the present invention is suitable for use in optical disc bases to free them of misreading due to pitting, in windows of aircraft for wind-proofing, automobiles or architectural structures, solar cell receptors, liquid crystal display panels, protective sheets of computer touch panels, etc.

The present invention will be explained in more detail by the following Examples, in which "part" means "part by weight".

EXAMPLE 1

| Formulation: | |
|---|---|
| Aronix M-8030 (*1) | 20 parts |
| trimethylolpropane triacrylate | 80 parts |
| 1-hydroxy-1-cyclohexylacetophenone | 8 parts |

(*1) Trade name, oligoester acrylate which has 3 or more parts of an acryloyl group in one molecular and a number average molecular weight of about 400, marketed by Toagosei Chemical Industry Co., Ltd.

The above formulation was uniformly mixed to obtain an actinic ray-curable primer composition A.

The actinic ray-curable primer composition A was coated on to a polycarbonate plate of 2 mm in thickness according to the spin coating process, followed by irradiation in an irradiation dose of 500 mj/cm² by use of a mercury lamp to form a cured primer film which has a thickness of about 2 μm. Next, a $SiO_2$ layer which has a thickness of 0.5 μm was laminated on the surface of the above cured primer film by deposition at a film-forming speed of 0.5 nm/sec. by use of an electron beam irradiation vacuum deposition apparatus to obtain a surface-modified plastic plate.

EXAMPLE 2

| Formulation: | |
|---|---|
| Aronix M-9050 (*2) | 10 parts |
| dipentaerythritol hexacrylate | 10 parts |
| trimethylolpropane triacrylate | 70 parts |
| 1,6-hexanediol diacrylate | 10 parts |

(*2) Trade name, oligoester acrylate which has 3 or more parts of an acryloyl group in one molecular and a number average molecular weight of about 500, marketed by Toagosei Chemical Industry Co., Ltd.

The above formulation was uniformly mixed to obtain an actinic ray-curable primer composition B.

The procedures of Example 1 were repeated except that the actinic ray-curable primer composition B was used in place of the actinic ray-curable primer composition A and that irradiation by electron rays was carried out in an irradiation dose of 10 Mrad in place of irradiation by use of the mercury lamp to obtain a surface-modified plastic plate.

EXAMPLE 3

The procedures of Example 1 were repeated except that the film thickness of the cured primer film was changed to 5 μm from 2 μm, and an $Al_2O_3$ layer was deposited on the cured primer film instead of depositing the $SiO_2$ layer thereon to obtain a surface-modified plastic plate.

EXAMPLE 4

Formulation:
phosphagen compound represented by the formula:

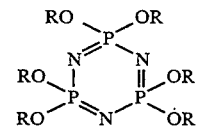

where R is

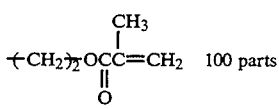

photopolymerization initiator represented by the formula:

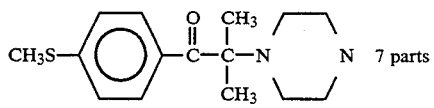

The above formulation was uniformly mixed to obtain an actinic ray-curable primer composition C.

The procedures of Example 1 were repeated except that the actinic ray-curable primer composition C was used in place of the actinic ray-curable primer composition A and the cured primer film had a thickness of 1 μm to obtain a surface-modified plastic plate.

EXAMPLE 5

| Formulation: | |
| --- | --- |
| Photomer 5007 (*3) | 5 parts |
| trimethylolpropane triacrylate | 75 parts |
| ethylene glycol diacrylate | 20 parts |
| 1-hydroxy-l-cyclohexylacetophenone | 8 parts |

(*3) Trade name, polyester modified acrylate oligomer which has a number average molecular weight of about 1500-2000, marketed by San Nopco Ltd.

The above formulation was uniformly mixed to obtained an actinic ray-curable primer composition D.

The procedures of Example 1 were repeated except that the actinic ray-curable primer composition D was used in place of the actinic ray-curable primer composition A and the thickness of the SiO$_2$ layer formed by deposition was changed to 0.3 μm from 0.5 μm to obtain a surface-modified plastic plate.

EXAMPLE 6

The procedures of Examples 1 were repeated except that a polymethyl methacrylate plate which has a thickness of 2 mm was used in place of the polycarbonate plate in Example 1 as the plastic substrate to obtain a surface-modified plastic plate.

EXAMPLE 7

The procedures of Examples I were repeated except that a polycarbonate film 125 μm thick was used in place of the polycarbonate plate of 2 mm in thickness in Example 1 to carry out the surface modification and to obtain a surface-modified plastic plate.

EXAMPLE 1

| Formulation: | |
| --- | --- |
| methyltrimethoxysilane | 80 parts |
| phenyltrimethoxysilane | 20 parts |
| Y-acryloyloxypropyltrimethoxysilane | 10 parts |
| deionized water | 100 parts |
| 98 percent formic acid | 1 part |
| hydroquinone | 0.01 part |

The above formulation was uniformly mixed and the mixture was kept at 50° C. with agitation for one hour, followed by adding 100 parts of toluene, heating up to 120° C., heating slowly to subject the alkoxysilane to condensation and to remove the by-produced methanol and water, cooling down to 80° C., adding 100 parts of toluene, slowly heating up to 120° C. while removing the solvent, and cooling to obtain a varnish which has a solid content of 40 percent. To 100 parts of the varnish was added 3 parts of 1 ohydroxy-1-cyclohexylacetophenone to obtain an actinic ray-curable primer composition E.

The procedures of Example 6 were repeated except that the above actinic ray-curable primer composition E was used in place of the actinic ray-curable primer composition A in Example 6 and the thickness of the SiO$_2$ layer formed by deposition was changed to 0.8 μm from 0.5 μm to obtain a surface-modified plastic plate.

Comparative Example 1

The procedures of Example 1 were repeated except that a SiO$_2$ layer was laminated by deposition directly onto the polycarbonate plate without forming a cured primer film to obtain a surface-modified plastic plate.

Comparative Example 2

The procedures of Example 1 were repeated except that a SiO$_2$ layer was formed in a thickness of 0.05 μm to obtain a surface-modified plastic plate.

Comparative Example 3

The procedures of Example 1 were repeated except that a SiO$_2$ layer was formed in a thickness of 2 μm to obtain a surface-modified plastic plate.

Comparative Example 4

The procedures of Example 1 were repeated except that the SiO$_2$ layer was not laminated on the surface of the cured primer film to obtain a surface-modified plastic plate.

EXAMPLE

| Formulation: | |
| --- | --- |
| dimethyldiethoxysilane | 6 parts |
| methyltriethoxysilane | 10 parts |
| orthoethylsilicate | 4 parts |
| ethanol | 78 parts |
| deionized water | 2 parts |
| Neostann U-200* | 0.4 part |

*Trade name, reaction • curing catalyst, tin salt of carboxylic acid, marketed by Nitto Kasei Co., Ltd.

A mixture of the above formulation was heated at 60° C. for 2 hours in a flask to carry out hydrolysis.condensation reaction to obtain a film-forming silicone solution A. The film-forming silicone had a number average molecular weight of about 500. To a total amount of the above film-forming silicone solution A were added 0.4 part of Flowlen AKS (Trade name, silicone leveling agent, marketed by Kyoeisha Chemical Co., Ltd.) and 0.4 part of Tinuvin 900 (Trade name, benzotriazole based ultraviolet light absorber, marketed by CIBA-GEIGY A.G.), followed by uniformly stirring to obtain a heat-curable primer composition A.

The above heat-curable primer composition A was coated by a bar coater coating process on the surface of an oriented Acrylite (Trade name, marketed by Mitsubishi Rayon Co., Ltd., polymethyl methacrylate polymer plastic plate, compatible product in accordance with MIL-P-25690A) which had a thickness of 6 ram, followed by heating at 80° C. for one hour to obtain a cured primer film which had a film thickness of about 2 μm.

Next, a SiO₂ layer which had a thickness of 0.5 μm was laminated on the above cured primer film by deposition at a film-forming speed of 0.5 nm/sec. by use of an electron beam irradiation vacuum deposition apparatus to obtain a surface-modified plastic plate.

EXAMPLE 10

| Formulation: | |
| --- | --- |
| β-(trimethoxysilyl)ethyltrimethoxysilane | 6 parts |
| methyltriethoxysilane | 6 parts |
| dimethyldiethoxysilane | 8 parts |
| ethanol | 78 parts |
| deionized water | 2 parts |
| Neostann U-200 (same as above) | 0.4 part |

A mixture of the above formulation was heated at 60° C. for 2 hours in a flask to carry out hydrolysis.condensation reaction to obtain a film-forming silicone solution B. The film-forming silicone thus obtained had a number average molecular weight of about 600. To a total amount of the film-forming silicone solution B was added 0.4 part of Flowlen AKS, followed by uniformly stirring to obtain a heat-curable primer composition B.

The procedures of Example 9 were repeated except for using the above heat-curable primer composition B in place of the heat-curable primer composition A and the film thickness of the cured primer film was changed to 5 μm from 2 μm to obtain a surface-modified plastic plate.

EXAMPLE 11

| Formulation: | |
| --- | --- |
| ethyltriethoxysilane | 7 parts |
| methyltriethoxysilane | 8 parts |
| orthoethylsilicate | 5 parts |
| ethanol | 78 parts |
| deionized water | 2 parts |
| tetraethylammonium bromide | 0.4 part |

A mixture of the above formulation was heated at 60° C. for 2 hours in a flask to carry out hydrolysis.condensation reaction to obtain a film-forming silicone solution C. The film-forming silicone thus obtained had a number average molecular weight of about 500. To a total amount of the resulting film-forming silicone, solution C was added 0.4 part of Flowlen AKS, followed by uniformly stirring to obtain a heat-curable primer composition C.

The procedures of Example 9 were repeated except for using the above heat-curable primer composition C in place of the heat-curable primer composition A and the thickness of the SiO₂ layer formed by deposition was changed to 0.3 μm from 0.5 μm to obtain a surface-modified plastic plate.

EXAMPLE 12

The procedures of Example 9 were repeated except for carrying out the deposition of an Al₂O₃ layer in place of carrying out the deposition of a SiO₂ layer to obtain a surface-modified plastic plate.

EXAMPLE 13

The procedures of Example 9 were repeated except that a polycarbonate plate which had a thickness of 6 mm was used in place of the oriented Acrylite used as the substrate in Example 9 to obtain a surface-modified plastic plate.

EXAMPLE 14

The procedures of Example 9 were repeated except that a heat-curable primer composition D prepared by uniformly mixing 3 parts of methyltriethoxysilane with 101.2 parts of the primer composition A used in Example 9 was used in place of the heat-curable primer composition A to obtain a surface-modified plastic plate.

Comparative Example 5

The procedures of Example 9 were repeated except that the SiO₂ layer formed as in Example 9 had a thickness of 0.2 μm to obtain a surface-modified plastic plate.

Comparative Example 6

The procedures of Example 9 were repeated except that the SiO₂ layer formed as in Example 9 had a thickness of 1.2 μm to obtain a surface-modified plastic plate.

EXAMPLE 15

Primer-PC-7A (a colorless and transparent resin solution mainly containing a copolymer comprising methyl methacrylate as a major component and having a solid content of about 7 percent, trade name, marketed by Shin-Etsu Chemical Co., Ltd.) was coated and dried on the surface of a polycarbonate plate which had a thickness of 2 mm to form a surface-treating layer thereon and to obtain a surface-treated plate for use as a substrate.

Separately a heat-curable primer composition E was prepared as follows.

| Formulation: | |
| --- | --- |
| orthoethylsilicate | 4 parts |
| methyltriethoxysilane | 16 parts |
| ethanol | 78 parts |
| deionized water | 2 parts |
| Neostann U-200 (same as above) | 0.4 part |

A mixture of the above formulation was heated at 60° C. for 2 hours in a flask to carry out hydrolysis.condensation reaction to obtain a film-forming silicone solution E. The film-forming silicone thus obtained had a number average molecular weight of about 500. To a total amount of the above film-forming silicone solution E were added 0.4 part of Flowlen AKS and 0.4 part of Tinuvin 900 followed by uniformly stirring to obtain a heat-curable primer composition E.

The above heat-curable primer composition E with the above formulation was coated by a bar coater coating process on the surface of the above substrate, followed by heating at 100° C. for one hour to form a cured film which had a film thickness of about 2 mm.

Next, a SiO₂ layer which had a thickness of 0.5 μm was laminated on the above cured primer film by deposition at a film-forming speed of 0.5 nm/sec. by use of an electron beam irradiation vacuum deposition apparatus to obtain a surface-modified plastic plate.

EXAMPLE 16

The procedures of example 15 were repeated except that the following heat-curable primer composition F was used in place of the heat-curable primer composition E and the thickness of the SiO₂ layer formed by deposition was changed to 0.8 μm from 0.5 μm to obtain a surface-modified plastic plate. A heat-curable primer composition F was prepared as follows:

| Formulation: | |
| --- | --- |
| β-(triethoxysilyl)-ethyltriethoxysilane | 4 parts |
| dimethyldiethoxysilane | 14 parts |
| dimethyldimethoxysilane | 2 parts |
| ethanol | 78 parts |
| deionized water | 2 parts |
| Neostann U-200 | 0.4 part |
| (same as above) | |

A mixture of the above formulation was heated at 60° C. for 2 hours in a flask to carry out hydrolysis.condensation for 2 hours in a flask to obtain a film-forming silicone solution F. The film-forming silicone thus obtained had a number average molecular weight of about 600. To a total amount of the resulting film-forming silicone solution F was added 0.4 part of Flowlen AKS (same as above), followed by uniformly stirring to obtain a heat-curable primer composition F.

EXAMPLE 17

The procedures of Example 15 were repeated except that the heat-curable primer composition C used in Example 11 was used in place of the heat-curable primer composition E and the thickness of the cured primer film was changed to 1 μm from 2 μm to obtain a surface-modified plastic plate.

EXAMPLE 18

The procedures of Example 15 were repeated except that polymethyl methacrylate plate which had a thickness of 2 mm was used in place of the polycarbonate plate subjected to surface treatment with Primer-PC-7A (same as above) as the substrate in Example 15 to obtain a surface-modified plastic plate.

EXAMPLE 19

The procedures of Example 18 were repeated except for laminating an $Al_2O_2$ layer in place of laminating the $SiO_2$ layer by deposition as in Example 18 to obtain a surface-modified plastic plate.

EXAMPLE 20

The procedures of Example 15 were repeated except that a heat-curable primer composition H prepared by uniformly mixing 3 parts of methyltriethoxysilane with 101.2 parts of the heat-curable primer composition E used in Example 15 was used in place of the heat-curable primer composition E to obtain a surface-modified plastic plate.

Comparative Example 7

The procedures of Example 15 were repeated except that a $SiO_2$ layer was laminated by deposition directly on the polycarbonate plate subjected to a surface treatment with Primer-PC-7A (same as above) without forming the cured film of the primer composition E as in Example 15 to obtain a surface-modified plastic plate.

Comparative Example 8

The procedures of Example 15 were repeated except that the $SiO_2$ layer formed by deposition as in Example 15 had a thickness of 0.05 μm to obtain a surface-modified plastic plate.

Comparative Example 9

The procedures of Example 15 were repeated except that the $SiO_2$ layer formed by deposition as in Example 15 had a thickness of 2 μm to obtain a surface-modified plastic plate.

The surface-modified plastic plates obtained in Examples 1–20 and Comparative Example 1–9 were subjected to tests shown in Table 1. The test results are shown in Table 1.

The tests in Table 1 were carried out according to the following test methods.

Test Methods

Appearance: The surface of the surface-modified plastic plate was investigated by the naked eye. One showing nothing abnormal is evaluated as O.

Adhesion Properties: A test was made according to the squares-adhesion cellophane tape method defined in JIS K5400 8.5.2, provided the space between cuts was 1 min. Evaluation was made by observing the number of squares remaining without being peeled off among 100 squares.

Wear resistance: A surface-modified plastic plate was left at rest in a constant temperature chamber at 20° C. and the surface of the plate was rubbed with a steel wool #000 by reciprocating 10 times in a distance of about 8 cm in length applying a load of 1 kg/cm² to observe and evaluate the surface by the naked eye. One having no mars on the surface is shown as O.

Antistatic Properties: A surface of a surface-modified plastic plate was rubbed with gauze by reciprocating 10 times, followed by measuring a voltage on the surface by use of an ionic indicated marked by cm in length applying a load of 1 kg/cm² to observe and evaluate the surface by the naked eye. One having no mars on the surface is shown as O.

Antistatic Properties: A surface of a surface-modified plastic plate was rubbed with gauze by reciprocating 10 times, followed by measuring a voltage on the surface by use of an ionic indicator marketed by Hitachi Ltd.

Chemical Resistance: Tests were carried out by use of four kinds of test solutions, i.e., a 1N—NaOH aqueous solution, a 75 percent sulfuric acid aqueous solution, toluene and methyl isobutyl ketone. A glass ring which had an inner diameter of about 20 mm was adhered onto a surface-modified plastic plate, followed by placing about 2 ml of a test solution into the glass ring, covering the glass ring with a glass plate to prevent air from contacting, carrying out a spot test for 24 hours in a room at 20° C., and followed by evaluating the surface of a resulting coated plate. One showing no change is represented as O.

Pencil Hardness: A pencil marring test in accordance with JIS K5400 8.4.2 was carried out to evaluate according to resulting mars.

Water Resistance: Dipping a test plate for 18 hours into water at 20° C. was carried out in accordance with JIS K5400 8.19 except that a surface-modified plastic plate was used as the test plate, followed by subjecting the surface of the test plate to an adhesion test according to the squares-adhesion cellophane tape method defined in JIS K5400 8.5.2, provided the space between cuts was 1 mm. Evaluation was made by observing a number of squares remaining without being peeled off among 100 squares.

Weather Resistance: A surface of a test plate, which had been subjected to an accelerated weather resistance test according to a sunshine carbon arc lamp method defined in JIS K5400 9.8.1 to such an extent that the irradiation time may be 2,000 hours, was subjected to an adhesion test according to the squares-adhesion cellophane tape method defined in JIS K5400 8.5.2, provided the space between cuts was 1 min. Evaluation was made by observing a number of squares remaining without being peeled off among 100 squares.

of 0.1 to 10 μm; and an inorganic material layer formed onto the cured film by a physical deposition using an inorganic material selected from the group consisting of SiO, SiO$_2$, ZrO$_2$, Al$_2$O$_3$, TiO$_2$, Ti$_2$O$_3$, Y$_2$O$_3$, Yb$_2$O$_3$, MgO, Ta$_2$O$_5$, CeO$_2$ and HfO$_2$, at a forming speed of the inorganic material layer in the range of 0.05 to 2.0 nm/sec., and having a thickness of 0.1 to 0.8 μm.

TABLE 1

| Test items | Examples | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| Appearance | ◯ | ◯ | ◯ | ◯ | ◯ | ◯ | ◯ | ◯ | ◯ | ◯ | crazing developed | ◯ |
| Adhesion properties | 100 | 100 | 100 | 100 | 100 | 100 | 100 | 100 | 80 | 100 | 70 | 100 |
| Wear resistance | ◯ | ◯ | ◯ | ◯ | ◯ | ◯ | ◯ | ◯ | ◯ | ◯ | ◯ | mars developed |
| Antistatic properties (kV) | about 0 | about 0 | about 0 | about 0 | about 0 | about 0 | about 0 | about 0 | about 0 | about 0 | about 0 | 4.0 |
| Chemical resistance | | | | | | | | | | | | |
| 1N-NaOH aqueous solution | ◯ | ◯ | ◯ | ◯ | ◯ | ◯ | ◯ | ◯ | ◯ | whitening | ◯ | whitening |
| 75% sulfuric acid aqueous solution | ◯ | ◯ | ◯ | ◯ | ◯ | ◯ | ◯ | ◯ | ◯ | ◯ | ◯ | ◯ |
| toluene | ◯ | ◯ | ◯ | ◯ | ◯ | ◯ | ◯ | ◯ | ◯ | ◯ | ◯ | whitening |
| ethanol | ◯ | ◯ | ◯ | ◯ | ◯ | ◯ | ◯ | ◯ | ◯ | ◯ | ◯ | ◯ |
| methyl isobutyl ketone | ◯ | ◯ | ◯ | ◯ | ◯ | ◯ | ◯ | ◯ | ◯ | ◯ | ◯ | whitening |
| Pencil hardness | 4H | 4H | 3H | 5H | 3H | 7H | 4H | 6H | 2H | 2H | 4H | 2H |
| Water resistance | 100 | 100 | 100 | 100 | 100 | 100 | 100 | 100 | 60 | 100 | 60 | 100 |
| Weather resistance | 100 | 100 | 100 | 100 | 100 | 100 | 100 | 100 | 60 | 100 | 60 | 100 |

| Test items | Examples | | | | | | | | | | | | Comparative Example | | | | |
|---|---|---|---|---|---|---|---|---|---|---|---|---|---|---|---|---|---|
| | 9 | 10 | 11 | 12 | 13 | 14 | 15 | 16 | 17 | 18 | 19 | 20 | 5 | 6 | 7 | 8 | 9 |
| Appearance | ◯ | ◯ | ◯ | ◯ | ◯ | ◯ | ◯ | ◯ | ◯ | ◯ | ◯ | ◯ | ◯ | crazing developed | ◯ | ◯ | crazing developed |
| Adhesion properties | 100 | 100 | 100 | 100 | 100 | 100 | 100 | 100 | 100 | 100 | 100 | 90 | 100 | 90 | 80 | 100 | 70 |
| Wear resistance | ◯ | ◯ | ◯ | ◯ | ◯ | ◯ | ◯ | ◯ | ◯ | ◯ | ◯ | ◯ | ◯ | ◯ | ◯ | ◯ | ◯ |
| Antistatic properties (kV) | about 0 | about 0 | about 0 | about 0 | about 0 | about 0 | about 0 | about 0 | about 0 | about 0 | about 0 | about 0 | about 0 | about 0 | about 0 | about 0 | about 0 |
| Chemical resitance | | | | | | | | | | | | | | | | | |
| 1N-NaOH aqueous solution | ◯ | ◯ | ◯ | ◯ | ◯ | ◯ | ◯ | ◯ | ◯ | ◯ | ◯ | ◯ | whitening | ◯ | ◯ | whitening | ◯ |
| 75% sulfuric acid aqueous solution | ◯ | ◯ | ◯ | ◯ | ◯ | ◯ | ◯ | ◯ | ◯ | ◯ | ◯ | ◯ | ◯ | ◯ | ◯ | ◯ | ◯ |
| toluene | ◯ | ◯ | ◯ | ◯ | ◯ | ◯ | ◯ | ◯ | ◯ | ◯ | ◯ | ◯ | ◯ | ◯ | ◯ | ◯ | ◯ |
| methyl isobutyl ketone | ◯ | ◯ | ◯ | ◯ | ◯ | ◯ | ◯ | ◯ | ◯ | ◯ | ◯ | ◯ | ◯ | ◯ | ◯ | ◯ | ◯ |
| Pencil hardness | 7H | 7H | 6H | 6H | 4H | 7H | 4H | 4H | 4H | 7H | 6H | 4H | 5H | 7H | H | 2H | 4H |
| Water resistance | 100 | 100 | 100 | 100 | 100 | 100 | 100 | 100 | 100 | 100 | 100 | 00 | 100 | 50 | 60 | 100 | 60 |
| Weather resistance | 100 | 100 | 100 | 100 | 100 | 100 | 100 | 100 | 100 | 100 | 100 | 00 | 100 | 70 | 60 | 100 | 60 |

What is claimed is:

1. A surface-modified plastic plate, which is a laminate consisting of: a plastic substrate; a cured film of an actinic ray-curable primer composition comprising a binder component consisting of 30 to 100 parts by weight of (a) polymerizable unsaturated double bond-containing silicone resin having at least two polymerizable unsaturated double bond-containing groups, said component (a) having a number average molecular weight of 200 to 20,000 and having 0.1 to 10 moles of polymerizable unsaturated double bond-containing groups per 1 kg of said component (a); and, 0 to 70 parts by weight of (b) a polymerizable unsaturated monomer copolymerizable with said component (a), a total amount of said component (a) and said component (b) being 100 parts by weight, said cured film being formed onto a surface of the plastic substrate in a film thickness 2. The surface-modified plastic plate as claimed in claim 1 wherein the polymerizable unsaturated double bond-containing silicone resin is methacryloyl or acryloyl group-containing silicone resin.

3. The surface-modified plastic plate as claimed in claim 1 wherein said polymerizable unsaturated double bond-containing silicone resin is obtained by condensation of a silane compound having a polymerizable unsaturated double bond-containing group and hydrolyzable group with a silane compound having a hydrolyzable group.

4. The surface-modified plastic plate as claimed in claim 3, wherein said surface-modified plastic plate is for use in a member selected from the group consisting of an optical disc base, a window of an aircraft, an automobile, an architectual structure, a solar cell structure, a liquid crystal display panel and a protective sheet of a computer touch panel.

5. The surface-modified plastic plate as claimed in claim 1 wherein the inorganic material layer is formed by using an inorganic material selected from the group consisting of $SiO_2$ and $Al_2O_3$.

6. The surface-modified plastic plate as claimed in claim 1, wherein said surface-modified plastic plate is for use in a member selected from the group consisting of an optical disc base, a window of an aircraft, an automobile, an architectual structure, a solar cell structure, a liquid crystal display panel and a protective sheet of a computer touch panel.

7. A surface-modified plastic plate as claimed in claim 1, wherein the inorganic material layer has a thickness of 0.5 to 0.8 μm.

8. A surface-modified plastic plate for use in a window, which comprises a laminate consisting of: a plastic plate; a cured film of a heat-curable primer composition comprising, at least one member selected from the group consisting of a compound represented by the formula (I):

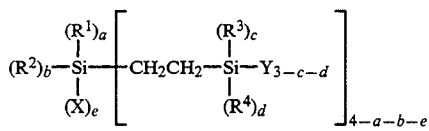

wherein $R^1$, $R^2$, $R^3$ and $R^4$ are the same or different and each represents a substituted or unsubstituted alkyl group, an aryl group or an alkenyl group, each of these groups having 1 to 13 carbon atoms, X and Y are the same or different and each represents a hydrolyzable group selected from the group consisting of an alkoxy group, a halogen atom and an acyloxy group, a, b, c and d are each an integer of 0 or 1, e is an integer of 0 to 4, and a total of a, b and e is an integer of 2 to 4, a hydrolyzate of said compound and a condensate of said compound, said cured film being formed on a surface of the plastic plate in a film thickness of 0.1 to 10 μm; and an inorganic material layer formed onto the cured film by a physical deposition using an inorganic material selected from the group consisting of SiO, $SiO_2$, $ZrO_2$, $Al_2O_3$, $TiO_2$, $Ti_2O_3$, $Y_2O_3$, $Yb_2O_3$, MgO, $Ta_2O_5$, $CeO_2$ and $HfO_2$, at a forming speed of the inorganic material layer in the range of 0.02 to 2.0 nm/sec., and having a thickness of 0.25 μm or more but less than 1.0 μm.

9. The surface-modified plastic plate as claimed in claim 8 wherein the window is a window for use in aircrafts and the plastic plate comprises a plastic selected from the group consisting of polymethyl methacrylate polymer and polycarbonate.

10. The surface-modified plastic plate as claimed in claim 8 wherein the window is a window for use in an automobile or an architectural structure.

11. The surface-modified plastic plate as claimed in claim 8 wherein $R^1$, $R^2$, $R^3$ and $R^4$ in the formula (I) are each an alkyl group.

12. The surface-modified plastic plate as claimed in claim 8 wherein X and Y in the formula (I) each is an alkoxy group having 1 to 3 carbon atoms.

13. A surface-modified plastic plate as claimed in claim 8 wherein the inorganic material layer comprises an inorganic material selected from the group consisting of $SiO_2$ and $Al_2O_3$.

14. A surface-modified plastic plate as claimed in claim 8, wherein the inorganic material layer has a thickness of 0.5 to 0.8 μm.

15. A surface-modified plastic plate, which is a laminate consisting of: a plastic substrate; a cured film of an actinic ray-curable primer composition comprising a binder component consisting of 30 to 100 parts by weight of (a) at least one component selected from phosphagen compounds represented by the formula:

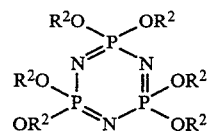

wherein $R^2$ is

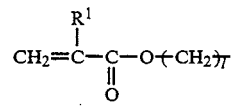

wherein $R^1$ is $CH_3$ or hydrogen atom and l is an integer of 1 to 4, said component (a) having a number average molecular weight of 200 to 20,000 and having 0.1 to 10 moles of polymerizable unsaturated double bond-containing groups per 1 kg of said component (a); and, 0 to 70 parts by weight of (b) a polymerizable unsaturated monomer copolymerizable with said component (a), a total amount of said component (a) and said component (b) being 100 parts by weight, said cured film being formed onto a surface of the plastic substrate in a film thickness of 0.1 to 10 μm; and an inorganic material layer formed onto the cured film by a physical deposition using an inorganic material selected from the group consisting of SiO, $SiO_2$, ZrO 2, $Al_2O_3$, $TiO_2$, $Ti_2O_3$, $Y_2O_3$, $Yb_2O_3$, MgO, $Ta_2O_5$, $CeO_2$ and $HfO_2$, at a forming speed of the inorganic material layer in the range of 0.05 to 2.0 nm/sec., and having a thickness of 0.1 to 0.8 μm.

16. The surface-modified plastic plate as claimed in claim is, wherein said surface-modified plastic plate is for use in a member selected from the group consisting of an optical disc base, a window of an aircraft, an automobile, an architectural structure, a solar cell structure, a liquid crystal display panel and a protective sheet of a computer touch panel.

* * * * *